United States Patent [19]

Lang

[11] 4,344,284
[45] Aug. 17, 1982

[54] HYDRAULIC AUXILIARY POWER STEERING

[75] Inventor: Armin Lang, Schwabisch Gmund, Fed. Rep. of Germany

[73] Assignee: Zahnradfabrik Friedrichshafen, AG., Friedrichshafen, Fed. Rep. of Germany

[21] Appl. No.: 114,389

[22] Filed: Jan. 22, 1980

[30] Foreign Application Priority Data

Feb. 2, 1979 [DE] Fed. Rep. of Germany ....... 2903988

[51] Int. Cl.³ .......................... B62D 5/08; F15B 13/04
[52] U.S. Cl. ..................................... 60/433; 180/132
[58] Field of Search ................. 60/433, 434, 468, 325; 180/132; 91/465, 464; 417/213

[56] References Cited

U.S. PATENT DOCUMENTS

| | | | |
|---|---|---|---|
| 3,180,233 | 4/1965 | Jablonsky | 91/465 X |
| 3,910,045 | 10/1975 | Herrmann | 60/433 |
| 3,922,953 | 12/1975 | Strauff | 91/465 X |
| 3,935,917 | 2/1976 | Elfy et al. | 180/132 X |

FOREIGN PATENT DOCUMENTS 1001132  1/1957  Fed. Rep. of Germany .
1653632  9/1971  Fed. Rep. of Germany .

Primary Examiner—Irwin C. Cohen
Attorney, Agent, or Firm—Zalkind & Shuster

[57] ABSTRACT

A control valve for a hydraulic booster steering system provides gradual control of inlet flow to the system pump to complete cut off of output, or by throttling of inlet flow to effect a pilot stream through the pressure pump. This occurs in the neutral position of the control valve during straight ahead steering. Where flow through the pump intake feed means is thus impeded, the pump simply cavitates in a known manner and to be of a type which is suction regulated, having a check valve means at the pressure outlet side. The advantage of cutting off inlet flow to the pump during straight ahead steering, or at least throttling of such inlet flow by a constantly open throttle passage, is to save energy otherwise wasted in heating the fluid.

10 Claims, 3 Drawing Figures

U.S. Patent  Aug. 17, 1982  4,344,284
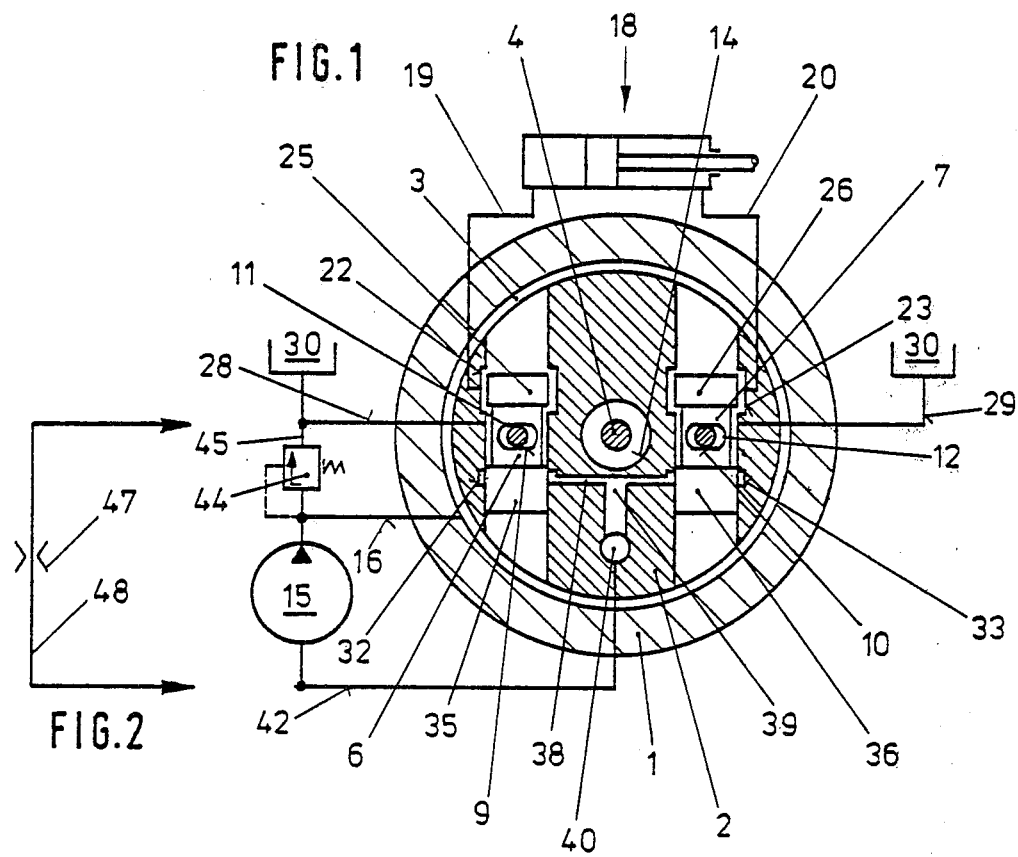
FIG.1
FIG.2
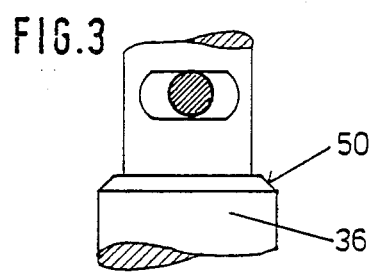
FIG.3

HYDRAULIC AUXILIARY POWER STEERING

In systems of the type wherein there is continuous circulating flow through the control valve in neutral condition of the valve, a so-called "open" system, or in "closed" systems wherein pump discharge is completely blocked at the control valve, there is energy waste. In either case the pump is working for a continuous flow through the valve or to provide a steady pressure flow to the valve which blocks flow, until steering actuation of the valve takes place and heat energy and friction losses occur during such non-steering periods.

Prior art open systems have the disadvantage in that even in use with standard passenger cars, there is an expected additional consumption of fuel from a 0.5 to one liter per 100 km. This additional fuel consumption is an energy loss and represents a pressure oil heating in long distance travel at high speeds on super highways with virtually no steering actuation required.

German Patent AS No. 1001 132 shows a closed system for hydraulic power steering where a valve member cuts off pressure flow from the pump in the neutral position. Accordingly, there is a leakage flow through the valve under maximum pressure to the extent permitted by maximum pressure relief valving. This has the disadvantage that heating of the oil increases pressure beyond that needed for most steering operations. Accordingly, the development of such heat is a waste of energy.

The present invention provides that for all conditions of travel, a minimum of energy expenditure will be required and unnecessary energy losses substantially excluded.

The present invention is applicable to any kind of hydraulic booster steering system such as the ball-nut integrated servomotor type as well as the rack and pinion type, and usable for single or double acting servomotors.

A particular feature of the present invention resides in the use of a pair of piston valves constructed so that the sequence of flow control is such that flow to the inlet of the pump from a tank is initially blocked or at least throttled in neutral position and opened fully only after the piston valves are shifted to cut off return flow to a tank from either pressure chamber of the servomotor, an effect of providing separate channeling for flow from a tank to the pump inlet and for return flow from respective pressure chambers of a servomotor.

A detailed description now follows in conjunction with the accompanying figures of the drawing.

FIG. 1 shows in radial section a valve that impedes pump inlet flow by complete cut-off.

FIG. 2 shows a throttle bypass modification.

FIG. 3 depicts a further modification including beveled edges on grooves to effect a throttled flow.

A control valve means 1 in neutral position is shown in FIG. 1 having a valve body or housing 2 and a pair of control valve members in the form of piston valves 6 and 7 chordally reciprocal in respective open ended bores in the valve body. The valve body is surrounded by an annular pressure chamber 3 which forms a portion of flow passage means comprised of several flow passages and chamber 3, depending on control positions of the piston valves, which chamber may be pressureless or conduct working pressure or return pressure, as will be described.

The usual torque rod 4 is provided for connection to a steering wheel (not shown) for return movement of the valve members. In a conventional manner, drive pins 11 and 12 of the respective valve members are carried by a fork-shaped steering spindle (not shown) and operate within respective slots 9 and 10 in the valve members. The pins are connected with torque bar 4, all operable in a known manner with the operator's steering wheel for actuating valve members 6 and 7. An axial bore 14 is provided in valve body 2 to accommodate torque rod 4.

An engine driven pressure pump 15 which provides working pressure for booster steering dependent on engine speed feeds pressure oil via an outlet flow line 16 which can be considered broadly as part of the passage means of the overall system. Such outlet pressure is fed to the annular pressure chamber 3. A double acting servomotor 18 having pressure chambers A and B is connected in the usual manner in the system by way of flow passages comprising lines 19 and 20 which connect chambers A and B with respective grooves 22 and 23 annularly recessed in valve body 2. It will be noted that valve members 6 and 7 have respective portions, i.e., elements or collars 25 and 26 within the confines of respective grooves 22 and 23 and that such grooves are axially longer than the respective collars 25 and 26. In the neutral position for straight ahead steering, chambers A and B of the servomotor communicate via annular chamber 3 with pressure flow passage 16 and also communicate via respective grooves 22 and 23 with return flow passages, respectively, 28 and 29 to respective oil reservoir tanks 30. As a matter of convenience, two such tanks 30 are shown, although obviously a single tank could be used.

The valve body 2 has a pair of valve elements such as short axial grooves 32 and 33 coacting with respective portions, i.e., elements or collars 35 and 36 of the respective valve members 6 and 7 for a purpose to be described, save to say that such grooves form part of an inlet feed means for pump 15 and are connected with each other by a flow passage, such as channel 38 in the valve body between the chordal bores. Channel 38 communicates via a further passage 39 and a passage 40 in the valve body with flow passage line 42 as part of the feed means connecting to the inlet of pump 15.

A pressure limiting check valve 44 is interposed between pump 15 and a tank 30 via line 45 so as to shunt excess pressure thereto. It should be noted that for energy economy the pressure limiting valve 44 may also be disposed between lines 16 and 42.

In the operation of the system, assuming the neutral position of the valve members and the servomotor as shown in the drawing, due to the flow blocking position of collars 35 and 36 in relation to the respective grooves 32 and 33, no inlet flow to the pump can occur which would otherwise pass from either such groove via the sequence of the flow passages 38, 39, 40 and 42, as will be evident. If a suction regulated pump be used with suitable check valves on the high pressure side, such a pump will cavitate in a known manner and there will be no pressure output to line 16. Chambers A and B communicate via return lines 28 and 29 with respective tanks 30. There would be fluid connection from annular channel 3 and grooves 22 and 23 to the respective return lines 28 and 29 to respective tanks 30. As a result, the entire system is pressureless. Now, assuming torque rod 4 is rotated via a hand steering wheel (not shown), the drive pins 11 and 12 rotate around the axis of the torque rod and if the direction of rotation is such that valve piston valve 7 moves downwardly, piston valve 6 will move upwardly. Accordingly, collar 26 on valve piston 7 moves just far enough to cut off the return flow connection of line 29 from the chamber B. Thus the movement of valve member 7 is such that collar 26 need shift only to a point just below the control edge, that is, the lower edge of groove 23, but until such return flow line cut-off occurs, the collar 36 still cuts off flow via groove 33 from respective tank 30 to the pump inlet feed means flow passage 38. After full cut-off of return line 29 from chamber B of the servomotor, collar 36 gradually opens axial groove 33 and accordingly continually enlarged inlet flow from tank 30 occurs through the sequence of passages 38, 39, 40, 42 to pump 15 so that the pump now has a working medium to effect a high pressure in line 16. Such outlet pressure passes to annular chamber 3 and thence through the open end of the bore in which valve member 7 reciprocates and via groove 23 and line 20 to chamber B of the servomotor.

Meanwhile, return flow from chamber A takes place via line 19, return line 28 to the tank 30 since collar 25 has now in the upward movement of piston valve 6 cut off connection from annular chamber 3 to line 28 and now blocks high pressure oil from access to line 19.

Thus, the annular chamber 3 is either pressureless, or substantially so, in neutral position, or a high pressure chamber during valve means actuation for steering purposes, and is isolated from any return flow during steering actuation. In neutral position for straight ahead travel, inlet flow to the pump is always cut off by the collars 35 and 36 in coaction with respective grooves 32 and 33 so that there is no output from the pump operative for steering purposes.

In the event of an opposite actuation of the valve members wherein piston valve 6 moves downwardly and piston valve 7 moves upwardly, the entire flow function takes place in a similar manner. Inlet flow to pump 15 thus comes from respective tank 30 via line 28 through flow passages 38, 39, 40, 42 to the pump inlet subsequent to cut off by collar 25 of return flow from chamber A by moving past the lower control edge of groove 22. Chamber A is then pressurized via line 16, annular pressure chamber 3 and line 19 via the upper open end of the bore which accommodates valve piston 6 and communicates annular chamber 3 with groove 22 and line 19.

It will be noted that in a steering actuation of the piston valves, moving in opposite directions, inlet flow to the pump is either via passage 28 or 29, depending on steering direction, due to the alternate action of collars 25 and 26, 35 and 36, respectively.

For the lowest consumption of energy the action of the valve members should be as described with complete cut-off of pump inlet flow until return flow from either chamber has been cut off. In other words, during the steering actuation, collars 25 and 26 in coaction with the lower edges of grooves 22 and 23 prevent flow from respective return lines 28 and 29 from reaching the pump inlet before collars 35 and 36 in coaction with respective grooves 32 and 33 open up such inlet flow.

Were the opposite effect to take place, that is, an initial opening of inlet flow to the pump before cutting off of return flow from either chamber, the pump would initially have a pressure output prematurely causing an excess flow that would have to be regulated at the edges of grooves 22 and 23 and this would result in energy loss.

However, there may be instances wherein a small pilot stream through the pump in neutral position of the system may be desirable and the energy loss small enough to be tolerated. Uner such circumstances, an element such as a throttle bypass 47 within a line 48 is provided, as shown in FIG. 3. Line 48 connects between pump inlet flow line 42 and tank 30 and permits inlet flow from the closer tank 30 for any desired predetermined pilot stream to effect an initial pressure in the outlet pressure line 16. This would be to secure the advantage of quicker steering response and can in certain instances be used to advangtage without significant energy loss.

Another mode of procuring a small pilot stream would be by providing the grooves 32 and 33 or the collars 35 and 36 with elements such as slightly beveled edges so as to effect a throttled flow therethrough in neutral position of the system. Such beveled edges are indicated by the reference numeral 50 in the drawing and permit a minimal pilot stream in neutral position from the respective tank to the return lines 28 and 29. In this instance, the beveled edges are shown as being in the upper edges of the grooves within the indicating circles with reference numerals 50. Such throttling means can be a small beveled area or notches. etc., of predetermined size to effect a desired pilot stream by way of such open flow area for a restricted, i.e., throttled pilot stream.

What is claimed is:

1. In a hydraulic power steering system of the kind described having a suction regulatable pump, a tank, a servomotor and actuatable inlet and exhaust control valve means, including respective flow passage means, all operable for controlling pressure and return flow for pressurizing and exhausting said servomotor;
   wherein said flow passage means comprises inlet flow feed means communicable between pump and said tank;
   the improvement wherein said inlet and exhaust control valve means has elements movable therewith controlling inlet flow to the suction side of said pump whereby said pump effects no output for pressurizing said servomotor until said valve means is actuated for steering and wherein continuous increase of pump inlet flow is effected during a steering actuation of said valve means.

2. In a system as set forth in claim 1, said valve means having a housing bore, at least one actuatable valve member (6) shiftable in said housing bore in response to operator control and having said flow control elements (25, 35) coacting with respective flow control groove means (22, 32) in said housing bore connecting with respective flow passage means (38, etc.) to cut off the inlet flow to said pump while connecting said servomotor to said tank in a neutral position of said valve member or to cut off return from said servomotor during a steering actuation of said valve member;
   wherein the coaction between said flow control elements and respective groove means effects initially a cut off of connection from said servomotor to said tank and subsequently gradual opening of inlet flow to said pump.

3. In a system as set forth in claim 1, including a pilot stream flow passage means (28, 60, 61) for connecting the pump inlet and outlet to the tank in neutral position of said valve means and a flow throttling means (47, 50)

in said pilot stream flow passage means whereby a pilot stream passes through said pump in neutral position of said valve means.

4. In a system as set forth in claim 1, including a pilot stream flow passage means (28, 60, 61) for connecting the pump inlet and outlet to the tank in neutral position of said valve means and a flow throttling means (47) in said pilot stream flow passage means whereby a pilot stream passes through said pump in neutral position of said valve means;
    said throttling means comprising a throttle (47) disposed exteriorly of said valve means and said pilot stream flow passage means comprising connection means (60, 61) one (60) of which is for tank connection and the other (61) for connection to the pump inlet.

5. In a system as set forth in claim 1, including a pilot stream flow passage means (28, 38, etc.) for connecting the pump inlet and outlet to the tank in neutral position of said valve means and a flow throttling means (50) in said pilot stream flow passage means whereby a pilot stream passes through said pump in neutral position of said valve means;
    said valve means having a valve body with a groove (32);
    said throttling means (50) comprising one (35) of said flow control elements coacting with said groove (32) to control pump inlet flow in said neutral position, said throttling means (50) being intermediate said flow control element and said groove and permitting a predetermined flow therebetween to effect said pilot stream.

6. In a hydraulic power steering system of the kind described having a pump, a tank, a servomotor and actuatable inlet and exhaust control valve means, including respective flow passage means, all operable for controlling pressure and return flow for pressurizing and exhausting said servomotor;
    wherein said flow passage means comprises inlet flow feed means communicatable between said pump and said tank; and
    which comprises means for controlling inlet flow to the suction side of said pump in a neutral position of said valve means whereby said pump effects no output for pressurizing said servomotor until said valve means is actuated for steering; the improvement which comprises:
    said inlet and exhaust control valve means comprising at least one piston valve (6) for control of the servomotor;
    said piston valve having a pair of collars (25, 35) spaced by a groove therebetween;
    said valve means comprising a valve body (2) having a bore in which said piston valve reciprocates and a pair of grooves (22, 32) in said bore coacting with respective collars of said piston valve;
    one said groove (22) in said bore having a flow passage means (28) for return flow from the servomotor and the other said groove (32) in said bore having passage means (38, etc.) between the tank and the pump inlet;
    wherein the collars and respective grooves are spaced and dimensioned so that, in a neutral position of said valve means one said collar (25) on said piston valve permits return flow from said servomotor to a tank and the other said collar (35) blocks flow from said tank to the pump inlet, while in a steering actuation said one collar (25) initially cuts off return flow from said servomotor and the other said collar (35) subsequently permits flow to said pump inlet.

7. In a hydraulic power steering system of the kind described having a pump, a tank, a double-acting servomotor and actuatable inlet and exhaust control valve means, including respective flow passage means, all operable for controlling pressure and return flow for pressurizing and exhausting said servomotor;
    wherein said flow passage means comprises inlet flow feed means communicatable between said pump and said tank; and
    which comprises means for controlling inlet flow to the suction side of said pump in a neutral position of said valve means whereby said pump effects no output for pressurizing said servomotor until said valve means is actuated for steering;
    said inlet and exhaust control valve means comprising piston valves (6, 7), each piston valve for control of a respective pressure chamber of the double acting servomotor; including means for actuating said piston valves simultaneously during steering actuation;
    said piston valves each having a pair of collars (25, 35; 26, 36) and each pair being spaced by a groove therebetween;
    said valve means comprising a valve body (2) having respective open ended chordal bores in which said piston valves reciprocate and a pair of grooves (22, 32; 23, 33) in each bore coacting with respective collars of said piston valves;
    the grooves in each said bore having respective flow passage means for return flow from respective chambers of the servomotor and for communication between the tank and the pump inlet;
    wherein the collars and respective grooves are spaced and dimensioned so that one collar (25, 35) on each said piston valve permits return flow from a respective servomotor chamber to the tank and the other collar (25, 36) on each piston valve blocks flow from the tank to the pump inlet in a neutral position of said valve means, while in a steering actuation said one collar (25 or 26) on one of said piston valves initially cuts off return flow from a respective servomotor chamber and a collar (35 or 36) of said other collars subsequently permits flow to said pump inlet;
    including a pressure chamber means (3) encompassing said valve body having flow passage means (16) to the pump means outlet and communicating through said bores with one said groove (22, 23) therein and flow passage means (19, 20) from each said latter grooves to a respective pressure chamber (A, B) of the servomotor.

8. In a system as set forth in claim 7, said valve body having a passage means (38) intermediate said chordal bores and communicating with a groove (32, 33) in each of said bores that coacts with a collar (35, 36) on the piston valve in the respective bore for controlling flow to the pump inlet and further passage means (39, 40, 42) extending from said first mentioned passage means (38) outwardly of said valve body for connection to the pump inlet.

9. In a hydraulic power steering servomotor system of the kind having a pump, a tank, a servomotor, and actuatable inlet and exhaust control valve means, including respective flow passage means, all operable for controlling pressure and return flow for pressurizing and exhausting said servomotor;

the improvement which comprises a first flow passage means (32, 38, 39, 40, 42) in said valve means for inlet flow to the suction side of said pump and said valve means having the second flow passage means (28) for return flow connection from the servomotor to the tank;

said inlet and exhaust control valve means having at least one actuatable member (6) movable therewith for flow control between said first and second flow passage means to reduce flow therebetween in a neutral position of said actuatable member but to increase flow therebetween permitting full pump inlet flow from said tank in an actuated position whereby said pump then effects a full outlet flow for operation of said servomotor;

said valve means comprising a housing bore wherein said actuatable member is movable; said first flow passage means comprising a groove (32) in said housing bore extending in the direction of actuation of said actuatable member to be gradually opened thereby for continuous increase of inlet flow to said pump during steering.

10. In a system as set forth in claim 9, including a constantly open throttling means (47, 50) intermediate said first flow passage means and said second flow passage means wherein said actuatable member impedes all but a predetermined pilot stream between said first and second passage means in said neutral position to effect a existing pump pressure output at all times.

* * * * *